(12) United States Patent
Bothien et al.

(10) Patent No.: US 9,334,804 B2
(45) Date of Patent: May 10, 2016

(54) ACOUSTIC DAMPING DEVICE

(71) Applicant: ALSTOM Technology Ltd, Baden (CH)

(72) Inventors: Mirko Ruben Bothien, Zürich (CH); Devis Tonon, Turgi (CH); Franklin Marie Genin, Baden (CH); Douglas Anthony Pennell, Windisch (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 0 days.

(21) Appl. No.: 14/505,564

(22) Filed: Oct. 3, 2014

(65) Prior Publication Data
US 2015/0096829 A1 Apr. 9, 2015

(30) Foreign Application Priority Data
Oct. 9, 2013 (EP) .................................... 13187828

(51) Int. Cl.
*F02C 7/24* (2006.01)
*F23M 20/00* (2014.01)
*F23R 3/16* (2006.01)

(52) U.S. Cl.
CPC ................ *F02C 7/24* (2013.01); *F23M 20/005* (2015.01); *F23R 3/16* (2013.01); *F23R 2900/00014* (2013.01)

(58) Field of Classification Search
CPC ............ F02C 7/24; F23R 2900/00014; F23M 20/005; F02M 35/1261
USPC ...................... 181/250, 292; 60/725
See application file for complete search history.

(56) References Cited

U.S. PATENT DOCUMENTS

| | | | | |
|---|---|---|---|---|
| 6,164,411 A | * | 12/2000 | Zoccola, Jr. .................. | 181/255 |
| 7,857,094 B2 | * | 12/2010 | Macquisten et al. .......... | 181/250 |
| 2005/0161280 A1 | * | 7/2005 | Furuya .......................... | 181/225 |
| 2005/0223707 A1 | * | 10/2005 | Ikeda et al. .................... | 60/725 |
| 2006/0123791 A1 | * | 6/2006 | Macquisten et al. ........... | 60/725 |
| 2006/0231329 A1 | * | 10/2006 | Borja et al. .................... | 181/250 |
| 2011/0308630 A1 | * | 12/2011 | Huber et al. ................... | 137/14 |
| 2012/0181107 A1 | * | 7/2012 | Hwang .......................... | 181/229 |

FOREIGN PATENT DOCUMENTS

EP 1 568 869 A1 8/2005
EP 1 596 130 A1 11/2005

* cited by examiner

*Primary Examiner* — Jeremy Luks
(74) *Attorney, Agent, or Firm* — Buchanan Ingersoll & Rooney PC

(57) ABSTRACT

An acoustic damper includes a neck and a damping volume. The neck has a mouth being in fluid connection with a chamber. The chamber is limited by an inner surface of at least one wall. The acoustic damper device includes a recess located between the mouth of the neck and the inner surface of the wall.

12 Claims, 5 Drawing Sheets

ACOUSTIC DAMPING DEVICE

CROSS-REFERENCE TO RELATED APPLICATIONS

This application claims priority to European application 13187828.2 filed Oct. 9, 2013, the contents of which are hereby incorporated in its entirety.

TECHNICAL FIELD

The invention is related to the acoustic damping of combustions dynamics and refers to an acoustic damping device. Combustion dynamics in the meaning of this application comprises pulsations, acoustic oscillations, pressure and velocity fluctuations and what is called in the everyday language noise. The terms "combustions dynamics" and "noise" are sometimes used synonymously.

BACKGROUND

Combustion dynamics occur for example in gas turbines at different places or chambers, where combustion dynamics occur. Examples for such places or chambers are the combustor chamber, a mixing chamber, a plenum and air channels. For reasons of simplification subsequently the term "chamber" is used and comprises all locations where combustion dynamics occur. In these chambers a gas (for example a mixture of fuel and air or exhaust gas) flows with high velocity which causes combustion dynamics. Burning air and fuel in the combustor chamber causes further combustion dynamics.

To reduce these combustion dynamics it is well known in the art, to install acoustic damping devices like a Helmholtz resonator, a half-wave tube, a quarter-wave tube or other types of damping devices with or without flow through of gas.

These acoustic damping devices have one or more resonance frequencies. If under operation of the gas turbine the combustions dynamics stimulate the resonance frequencies of the acoustic damping devices, the combustion dynamics are reduced or damped.

FIG. 1 illustrates the reflection coefficient (Y-Axis) and its dependency from the frequency.

The line 1 shows the theoretical reflection coefficient when using an acoustic damping device with a resonance frequency of approximately 300 Hertz. As can be seen at a frequency of 300 Hertz the reflection coefficient has a relative minimum of approximately 0.5. At frequencies of approximately 225 Hertz and 375 Hertz, the reflection coefficient has a local maximum of about 0.75.

To give an example: We assume that, for example, a combustion chamber of a gas turbine is equipped with an acoustic damping absorber having a resonance frequency of 300 Hertz. If we further assume that under operation in this combustion chamber noises ensue comprising frequencies of 300 Hertz it can be expected, that due to the local minimum of the reflection coefficient at 300 Hertz the noises with a frequency of 300 Hertz are effectively damped and therefore the noise emission of the combustor is reduced.

At an installed gas turbine the applicant has made some measurements and compared the theoretical reflection coefficient (line 1) with measurements taken at a same frequency range between 50 Hertz and 400 Hertz.

The measured values are illustrated in FIG. 1 by dots 3. By comparing the measured values with the theoretical reflection coefficient it can be seen that in the range between 250 Hertz and 350 Hertz the measured values 3 do not show a local minimum as should be expected.

In other words: The acoustic damping device does not work sufficiently.

SUMMARY

It is an object of the invention, to provide an acoustic damper that is capable of damping effectively in a gas turbine under operation and therefore effectively reduces the noise ensued from operation of the gas turbine at certain frequencies.

This objective has been achieved by using an acoustic damper comprising a neck and a damping volume, wherein the neck comprises a mouth being in fluid connection with a chamber, wherein the chamber is limited by an inner surface of at least one wall and wherein the mouth of the neck opens into a recess, which is located between the mouth of the neck and the inner surface of the wall.

By this recess the mouth of the neck does not open directly into the chamber, but opens into a recess with no or only low grazing flow. Grazing flow in the meaning of the claimed invention is the flow of gas inside the chamber that streams more or less parallel to an inner surface of the wall where the recess is located or perpendicular to the bias flow of gas through the neck of the damper.

In a combustor chamber gas flows with high velocity. This flow of gas, be it air and unburned fuel or exhaust gas after the fuel has been burnt, is a grazing flow with a high volume per second resulting in a high velocity of the grazing flow. The same effect may occur at low velocities of the grazing flow.

The inventors of the claimed invention became aware that this grazing flow disturbs the bias flow inside the neck of the acoustic damper. Consequently, the effectiveness of the acoustic damper comprising a neck and a damping volume is strongly reduced as has been explained in conjunction with the example of FIG. 1. In other words: The measured values 3 in FIG. 1 illustrate that the damping effect of an acoustic damper is limited by the grazing flow effect. Of course this effect also occurs in other chambers with grazing flow at other frequencies.

Since the claimed recess creates a region with no or only low grazing flow it is possible to have the mouth of the neck open into the recess and therefore the negative effects of the grazing flow on the damper are eliminated or at least significantly reduced. Consequently the acoustic damper is more effective.

It has been proven advantageous, if the mouth of the neck opens into the recess since in the recess the effect of the grazing flow is minimized.

To further reduce the influence of the grazing flow inside the recess, it is suggested to install a shield at the inner surface of the at least one wall adjacent to the recess. This shield protrudes into the chamber and further reduces the grazing flow inside the recess and therefore allows the acoustic damper to operate even more efficient.

The same objective can be achieved by installing at least one shield adjacent to the mouth of the neck and wherein the shield protrudes into the chamber. As mentioned before, one or more shields that protrude into the chamber deflect the grazing flow away from the mouth of the neck and reduce its negative effects on the efficiency of the acoustic damper.

It is possible and advantageous to provide an annular shield that surrounds the mouth of the neck. This annular shield deflects the grazing flow independent from the direction of the grazing flow and as a result, the mouth of the neck exits into a volume of the chamber with no or only low grazing flow.

As an alternative it is possible to install several shields and arrange these shields such that the mouth of the neck is located between the shields. On possibilities is to arrange two shields more or less parallel to each other.

Further, it is possible to install the at least one shield upstream or downstream of the mouth of the neck, to keep the grazing flow away from the mouth of the neck.

In several appliances it has been advantageous if an angle β between the at least one shield and the inner surface of the at least one wall is 90° or less, preferably 60°, 45°, 30° or 20°.

Doing so, especially with smaller angles β the effectiveness of the shields increases and the flow resistance induced by the at least one shield to the grazing flow is reduced. In other words: the shield becomes more effective and they cause less pressure drop in the grazing flow.

The claimed invention may be used with Helmholtz resonators with one or more damping volumes, a half-wave tube, a quarter-wave tube, a multi volume damper, a liner or any kind of acoustic damper that is known from the art. The chamber may be the combustor chamber or mixing chamber of a gas turbine or the like.

Further advantages and details of the claimed invention are subsequently described in conjunction with the drawings and their description.

DETAILED DESCRIPTION

Figure 2:
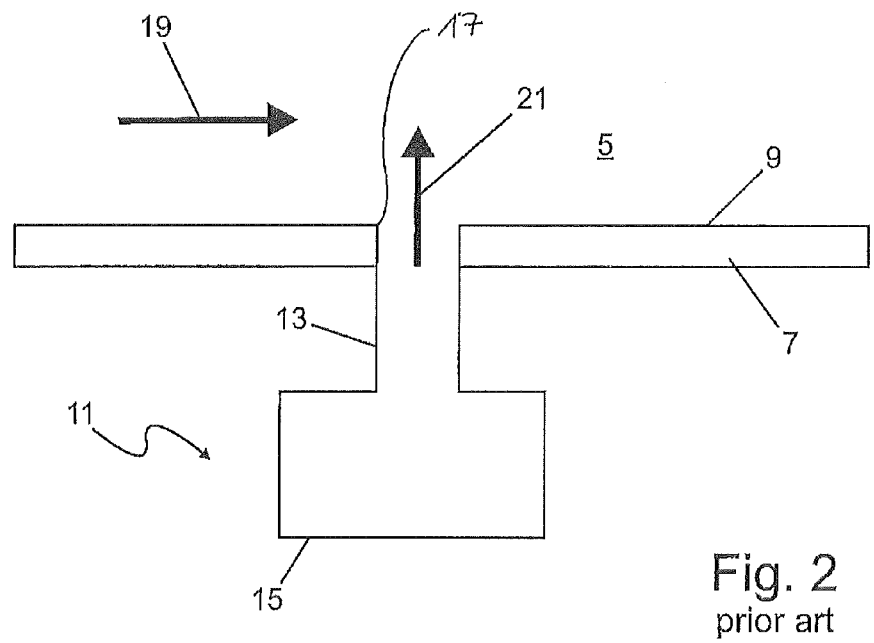

FIG. 2 (prior art) shows a schematic cross section of a chamber 5 that is limited by at least one wall 7 comprising an inner surface 9. As can be seen from FIG. 2 the chamber 5 is equipped with an acoustic damper 11 comprising a neck 13 and a damping volume 15. The neck 13 connects the damping volume 15 with the chamber 5. The opening of the neck 13 towards the chamber 5 is referred to as "mouth" 17 of the neck 13.

The damping device 11 in this exemplary embodiment may be a Helmholtz resonator, but the claimed invention is not limited to this type of acoustic damping device. The claimed invention may be used in conjunction with any type of acoustic damping device like a half-wave tube, a quarter-wave tube and the like.

Figure 1:
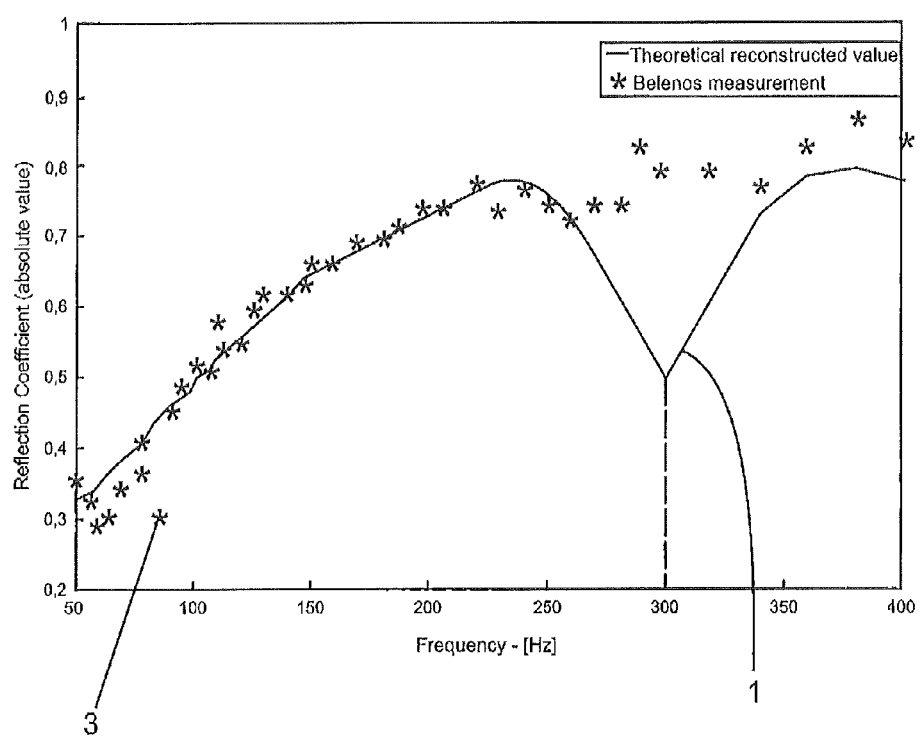
FIG. 1 The reflection coefficient of an exemplary acoustic damper with a resonance frequency at 300 Hertz, FIG. 2 a combustor chamber with an acoustic damper as known from the prior art and FIGS. 3 to 9 several embodiments of the claimed invention.

As can be seen from FIG. 2 the mouth 17 of the neck 13 and the inner surface 9 of the wall 7 have the same level. Since in the chamber 5 there is grazing flow (illustrated by the arrow 19), the bias flow 21 between the damping volume 15 and the combustor chamber 5 through the neck 13 is disturbed. This negative effect of the grazing flow 19 on the bias flow 21 that reduces the performance of the damper 11 has been explained in conjunction with FIG. 1 above.

Figure 3:
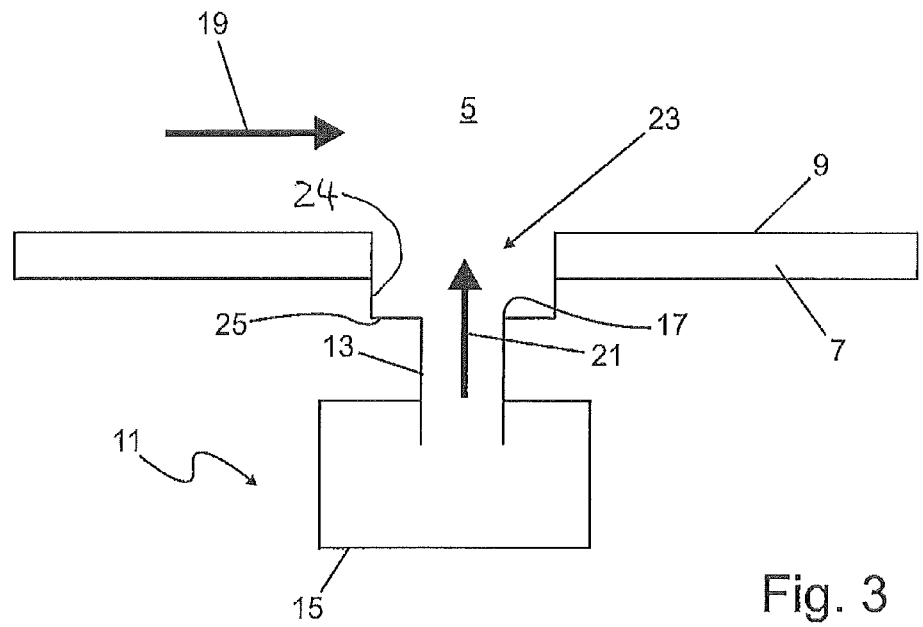

One embodiment of the claimed invention that avoids or at least significantly reduces the negative effects of the grazing flow 19 on the damper 11 is shown in FIG. 3. As can be seen from FIG. 3 between the mouth 17 and the inner surface 9 of the wall 7 a recess is installed. The mouth 17 of the neck 13 opens into a recess 23 in the at least one wall 7. In this embodiment the mouth 17 opens into a base 25 of the recess 23, it may open also into the surrounding wall 24 of the recess 23. In the recess 23 there is no or only little grazing flow and therefore the damper 11 works without being influenced by the grazing flow 19. Consequently the reflection coefficient of the acoustic damping device behaves as illustrated by the line 1 in FIG. 1.

Adding such a recess 23 is easy to realize and does not cause high costs.

Figure 4:
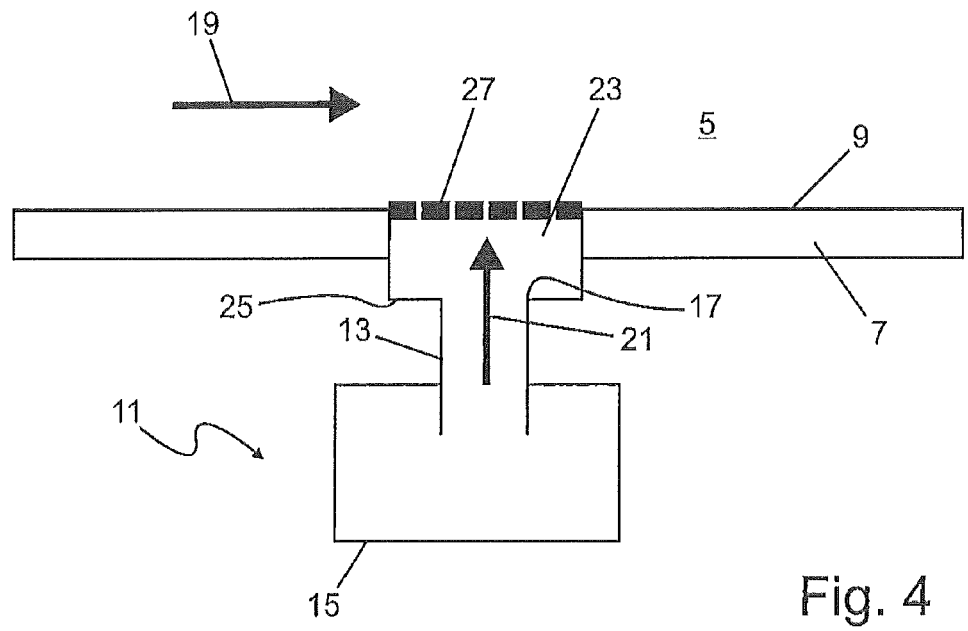

In FIG. 4 of a second embodiment of the claimed invention is illustrated. In addition to the embodiment illustrated in FIG. 3 the recess 23 is covered by a perforated plate 27. By covering the recess 23 with a perforated plate 27 the influence of the grazing flow 19 on the bias flow 21 through the neck 13 is further reduced.

Figure 5:
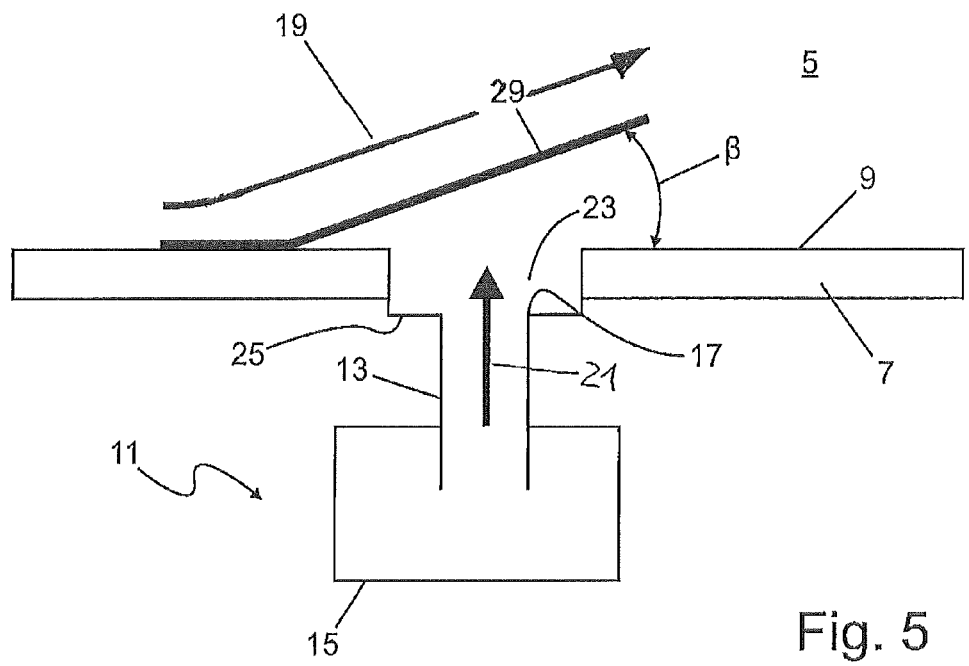

FIG. 5 shows a further embodiment of the claimed invention. This embodiment comprises a shield 29 that deflects the grazing flow away from the mouth 17 of the damper 11 and/or the recess 23.

The angle β between the shield 29 and the inner surface 9 of the wall 7 may be chosen and optimized by tests. In most appliances it has been sufficient in some cases, that the angle β is about 20° or 30°. In other cases and angle B of 90° has been advantageous.

The shield 29 without a recess 23 works as wall. In this case, the mouth 17 of the neck 13 exits directly into the combustor chamber similar to the situation as illustrated in FIG. 2.

In some appliances using a shield 29 with an angle β of less than 90° it is advantageous. In this case the shield 29 is installed upstream of the recess 23 and the mouth 17 with regard to the grazing flow 19.

Figure 6:
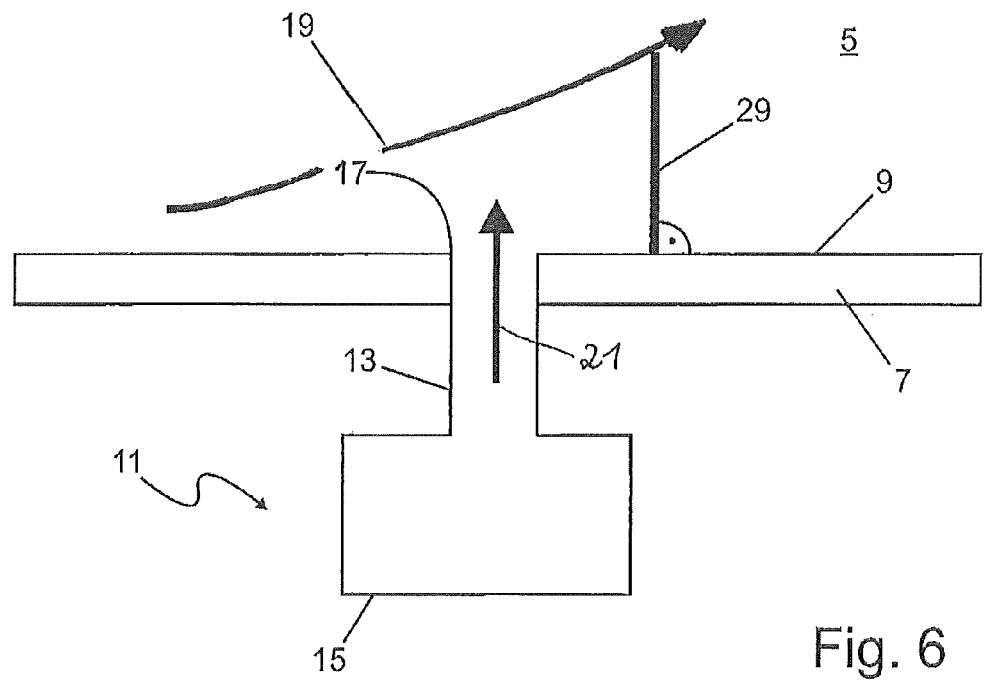

FIG. 6 illustrates a further embodiment of the claimed invention using one shield 29 protruding at an angle β of approximately 90° into the chamber 5 and being located downstream of the mouth 17 with regard to the grazing flow 19. In this embodiment the shield 29 also deflects the grazing flow 19 away from the mouth 17 of the neck and therefore the reflection coefficient of the damper 11 is not disturbed by the grazing flow 19 inside the combustor chamber 5. In case the shield 29 is located upstream of the mouth 17, a different angle β may be optimal.

Figure 7:
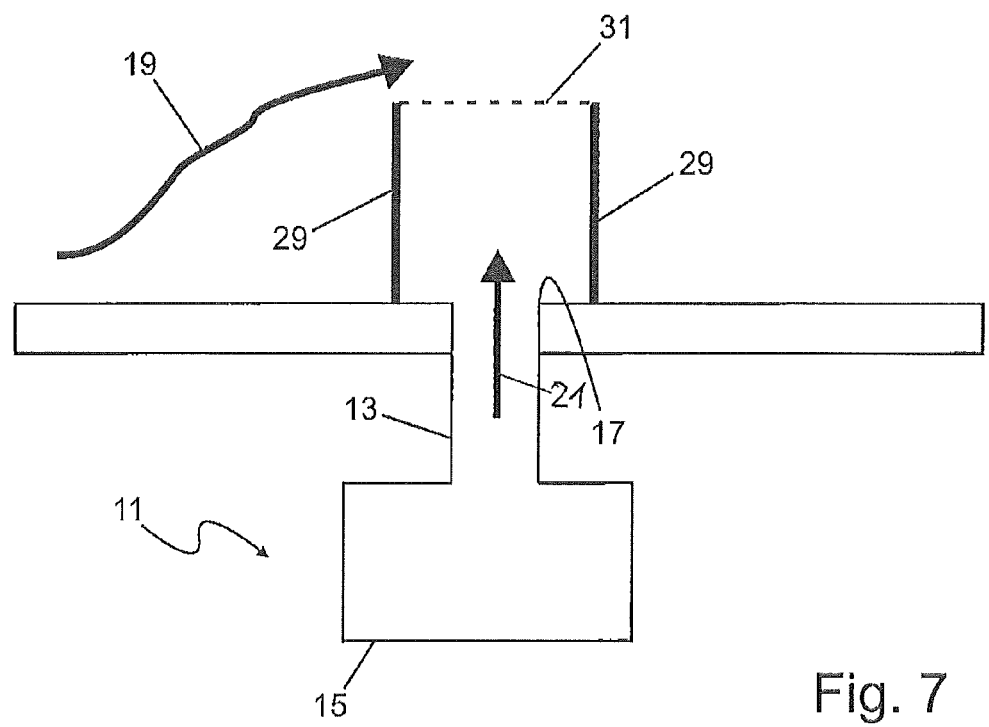

FIG. 7 illustrates a further embodiment of the claimed invention with two shields 29 which are more or less parallel to each other and perpendicular to the grazing flow. These shields 29 deflect even more the grazing flow 19 away from the mouth 17 of the neck.

As an alternative that is illustrated by the dotted line 31, the shield 29 may have a perforated plate that protects the mouth 17 of the neck 13 from all directions from the grazing flow 19. Since all embodiments shown so far, either comprise a recess 23 or at least one shield 29 with different angles β it is apparent, that the recesses 23 and the shields 29 may be combined.

Figure 8:
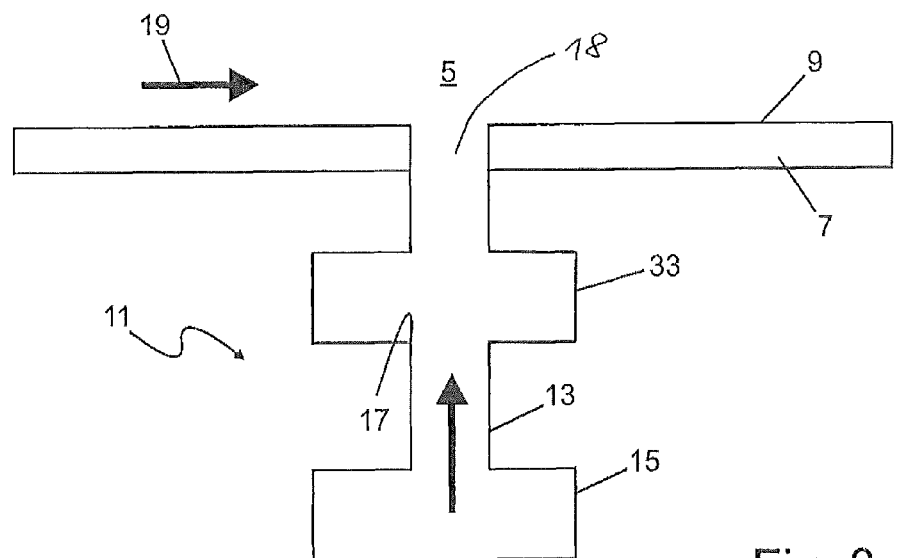

In FIG. 8 a further embodiment of the claimed invention is shown using an acoustic damper with a first damping volume 15 and a second damping volume 33. The mouth 17 of the neck 13 opens into the second damping volume 33 and therefore is not disturbed by the grazing flow 19 in the chamber 5. Without grazing flow both dampers are providing damping. In presence of grazing flow, the grazing flow can affect only the damping of the second damper (volume 33 and neck 18) while the first damper (volume 15 and neck 13) still provides damping.

Figure 9:
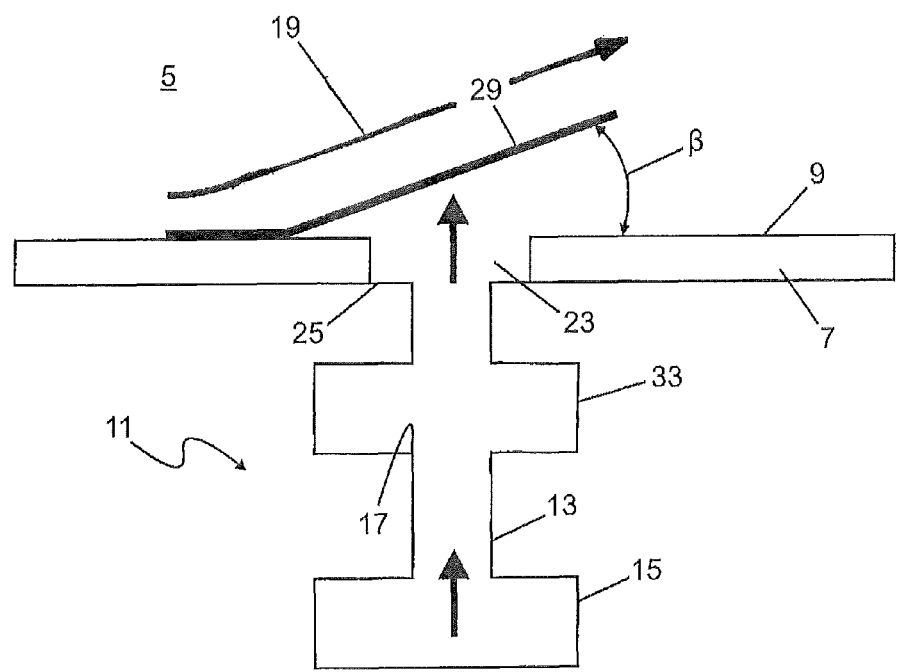

It is possible to combine this embodiment either with a recess 23 and/or at least one shield 29. These alternatives are shown in FIG. 9.

The invention claimed is:

1. A chamber of a gas turbine, comprising:
   at least one wall having an inner surface limiting the chamber; and
   an acoustic damper, including:
   a neck;
   a damping volume, wherein the neck includes a mouth being in fluid connection with the chamber, wherein the at least one wall includes a recess and the mouth of the neck opens into the recess; and
   wherein at the inner surface of the at least one wall and adjacent to the recess at least one shield protrudes into the chamber.

2. An acoustic damper, comprising:
   a neck and a damping volume, wherein the neck includes a mouth being in fluid connection with a chamber limited by an inner surface of at least one wall, wherein the at least one wall includes a recess and the mouth of the neck opens into the recess, and wherein at the inner surface of the at least one wall and adjacent to the mouth at least one shield protrudes into the chamber.

3. The chamber according to claim 1, wherein the at least one shield is annular and surrounds the mouth of the neck.

4. The chamber according to claim 1, comprising:
   two shields and the mouth of the neck is located between the shields.

5. The chamber according to claim 1, wherein inside the chamber a gas flows, and the at least one shield is configured to deflect the gas flow away from the mouth of the neck.

6. The chamber according to claim 1, wherein an angle between the at least one shield and the at least one wall is 90° or less.

7. The chamber according to claim 1, wherein the damper is a Helmholtz resonator comprising one or more damping volumes, a half-wave tube, a quarter-wave tube, multi-volume damper, a liner or any kind of acoustic flow through damper.

8. The chamber according to claim 1, wherein the chamber is a combustor chamber, a mixing chamber, a plenum and/or an air channel of a gas turbine.

9. The chamber according to claim 1, wherein an angle between the at least one shield and the at least one wall is 60° or less.

10. The chamber according to claim 1, wherein an angle between the at least one shield and the at least one wall is 45° or less.

11. The chamber according to claim 1, wherein an angle between the at least one shield and the at least one wall is 30° or less.

12. The chamber according to claim 1, wherein an angle between the at least one shield and the at least one wall is 20° or less.

* * * * *